Sept. 24, 1929.  G. H. JONES  1,729,512
AUTOMOBILE EXPENSE MEMORANDUM DEVICE
Filed Oct. 22, 1928  2 Sheets-Sheet 1

George H. Jones
INVENTOR

BY Victor J. Evans
ATTORNEY

WITNESS:

Sept. 24, 1929.　　　G. H. JONES　　　1,729,512

AUTOMOBILE EXPENSE MEMORANDUM DEVICE

Filed Oct. 22, 1928　　2 Sheets-Sheet 2

George H. Jones
INVENTOR

BY *Victor J. Evans*
ATTORNEY

WITNESS:

Patented Sept. 24, 1929

1,729,512

UNITED STATES PATENT OFFICE

GEORGE H. JONES, OF SLATON, TEXAS

AUTOMOBILE EXPENSE MEMORANDUM DEVICE

Application filed October 22, 1928. Serial No. 314,288.

The object of this, my present invention, is the provision of an expense recording apparatus for use in connection with automobiles, and whereby the driver of the car will have a positive record of all expenditures occurring in the driving and repairing of the car.

The primary object is the provision of a simple apparatus of this type which may be easily and quickly clamped and likewise readily removed from the steering post column of the automobile and which is conveniently arranged with respect to the driver and which will not mar the column and will as a matter-of-fact add to the artistic appearance of the car.

A further object is the provision of an apparatus of this type which, in the main, comprises only two separable parts that are cheaply constructed, readily connected and easily and firmly attached to the steering post column of an automobile or like vehicle.

To the attainment of the foregoing the improvement also resides in certain other novel features of construction, combination and operative association of parts, one satisfactory embodiment of which is disclosed by the accompanying drawings.

Figure 1:
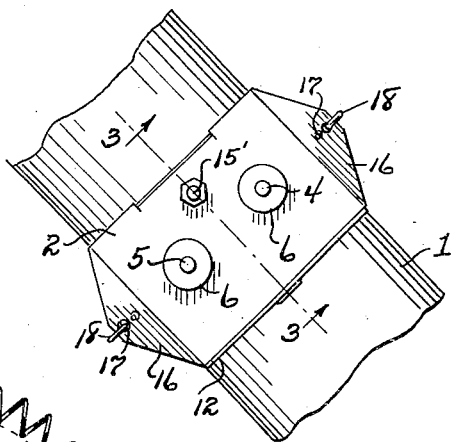
Figure 1 is a side elevation of the improvement in attached position.
Figure 2:
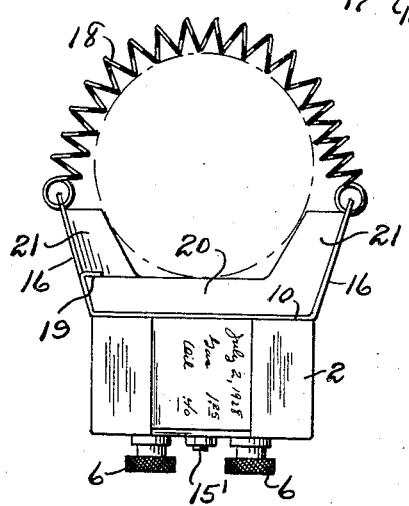
Figure 2 is a top plan view.
Figure 3:
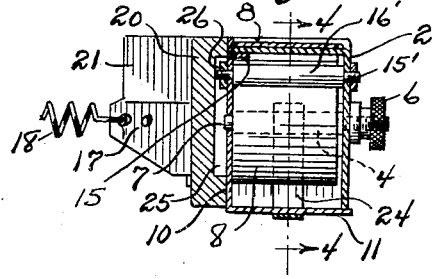
Figure 3 is a sectional view approximately on the line 3—3 of Figure 1.
Figure 4:
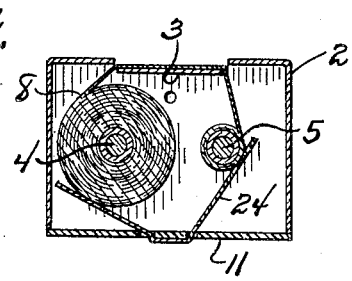
Figure 4 is a sectional view approximately on the line 4—4 of Figure 3.
Figure 5:
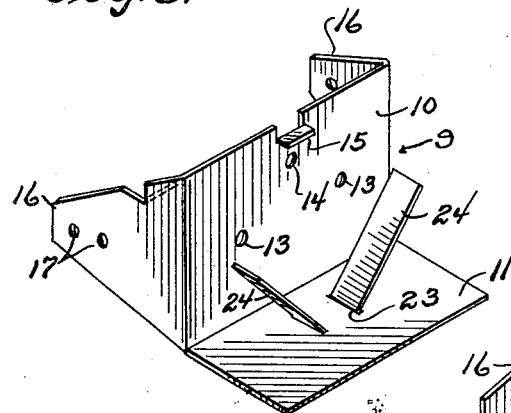
Figure 5 is a sectional view looking toward the front of the back element of the improvement.
Figure 6:
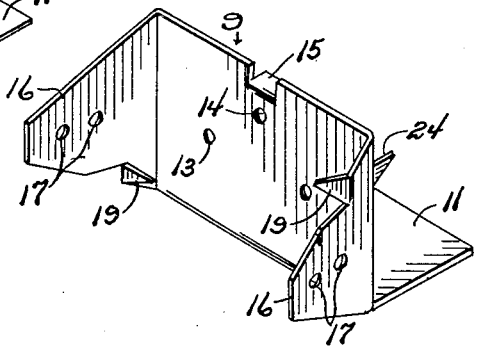
Figure 6 is a similar view looking toward the rear of said element.

As the description progresses it will be readily seen that when the paper upon which the record is made is fully filled, the same can be reversed, that is turned upside down and arranged upon the rolls therefor. The improvement, as disclosed by the drawings is designed to be removably attached to the steering post column of an automobile and the attaching means is such as will not mar the column and the device may be highly polished so as to add to the artistic appearance of the car.

Referring now to the drawings the numeral 1 designates the steering post column of an automobile. On this post there is adjustably and removably attached the improvement. The improvement contemplates essentially a front member 2 which is of a box-like construction except that the bottom and rear thereof are open. The front 2, at the top thereof, is centrally slitted at spaced intervals and bent to provide the same with a platen 3. Obviously the platen may be otherwise formed but the platen is necessarily arranged a slight distance above the top of the front. The front has revolubly arranged therein a pair of spaced rollers 4 and 5. The shafts for these rolls project a suitable distance beyond the face of the rear of the front member 2 and have fixed on their outer ends knurled heads 6 whereby the said rollers may be readily turned. The opposite ends of the shafts are for distinction indicated by the numeral 7.

The rollers 4 and 5 are designed to have arranged thereon the ends of a sheet of paper 8 which is trained over the platen 3, and upon the exposed portion of this sheet the records are made.

The back of the improvement is broadly indicated by the numeral 9. The face 10 of the back is of a size corresponding to that of the front 2. The face 10, at the lower edge thereof, is formed with a substantially rectangular extension 11 which is arranged right angularly with respect to the said face 10. The right angle extension or ledge 11 provides a support for the open bottom of the front 2. The face 10 of the back 9 is provided with a pair of spaced openings 13 that provide bearings for the ends 7 of the shafts of the rollers. In addition to this the face 10 is provided with an opening 14 designed for the reception of a bolt member 15' which has both of its ends threaded and which is passed through an opening in the face of the front 2. In the showing of the drawings both ends of the bolt 15 have screwed thereon nuts, but obviously the bolt may be headed and the end thereof that passes through the opening 14 is threaded and, of course, engaged by a nut. The bolt 15' is received through a sleeve 16' whose ends contact with the face of the front and with the face 10 of the back and the face 10 of the back is formed with an outstanding ledge 15 that provides a rest for the platen plate 3.

Figure 7:
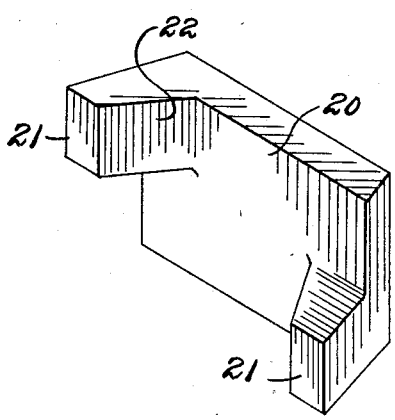
Figure 7 is a similar view of the elastic or compressible block.
Figure 8:
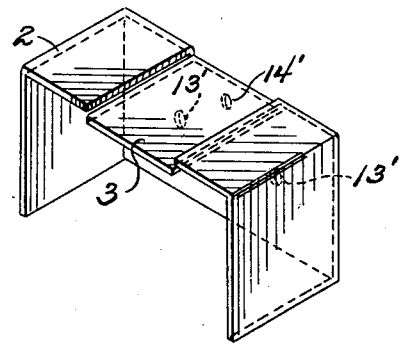
Figure 8 is a similar view looking toward the front or casing.

The back 9 is formed with rearwardly extending preferably tapered spring sides 16, the said sides being provided with a plurality of alining openings 17, any one of which openings being designed to receive therein the ends of a coil spring 18 and this spring is adapted to be arranged around the steering post column 1. The spring sides 16' of the back 9 have their opposite, that is, their upper and lower longitudinal edges slitted and bent or otherwise formed with inwardly extending fingers 19, and these fingers are designed to contact with and hold against the rear of the face 10 of the back a rubber or other compressible block 20. By reference especially to Figure 7 of the drawings it will be seen that this block has its diagonally opposed corners formed with extensions 21 and that the inner faces of the said extensions are rounded or concaved, as at 22. Also by reference to the drawings it will be seen that the fingers 19 are arranged in contact with the outer face of the block at points beyond the projections 21.

The flanged extension 11 on the back 9 is provided with a pair of spaced openings 23 and through these openings there are passed the central straight portion of a flat spring. The spring, from its said straight portion is formed with upwardly extending angle arms 24, respectively, and these arms contact with the paper on the rollers 4 and 5 and serve as brake means for preventing the free movement of the paper when the rollers are turned.

The block 20 has the face thereof received against the wall 10 of the back member 9 channeled or recessed, as at 25, to receive therein the ends of the shafts and likewise the bolt 26 which is screwed on one end of the shaft 15. By this arrangement it will be apparent that it is merely necessary to remove the block and unscrew the nut 26 to permit the front 2 being removed from the back when the paper in the front is to be removed or reversed, as above stated. Also it will be noted that a single bolt, in combination with the flanges 12 and the extension 11 of the back 9 hold the front firmly positioned on the said back.

The simplicity of my construction and the advantages thereof will, it is thought, be understood by those skilled in the art to which the invention relates without further detailed description. Obviously I do not wish to be restricted to the precise details herein set forth and, therefore, hold myself entitled to make such changes therefrom as fairly fall within the scope of what I claim.

Having described the invention, I claim:

1. The herein described construction of memorandum devices to be removably attached to the steering post column of an automobile, comprising a casing which includes a front that has rollers for a recording paper and a platen over which the paper turns and a back having a flanged extension to receive the front therein, removable means connecting the front and back, said back having rearwardly extending spring sides, a concaved elastic block on the back received between the sides and engaged thereby and a coil spring having its ends removably attached to the sides.

2. An expense memorandum device designed to be removably attached to the steering post column of an automobile comprising a front, having rollers journaled on shafts therein and operating handles for the rollers and said rollers designed to have arranged thereon a recording sheet that is windable from one roller onto the other and vice versa, a back including a plate having a flanged extension upon which the front rests, a single bolt passing between the front and back and a nut for the bolt contacting with the back, a spring having angle arms contacted by the extension to contact with the rolled paper, said back having angle extensions whose edges are inclined and provided, at diagonally opposed points with inwardly directed fingers, an elastic block having its diagonally opposed corners provided with extensions whose inner faces are rounded and which block is designed to be received between the fingers and held thereby on the back, an outwardly extending ledge plate on the back to contact with the inner wall at the top of the front, said sides of the back having spaced openings therethrough for the reception of the ends of a coil spring and the block having a depression to receive the mentioned nut and the inner ends of the shafts for the rollers.

In testimony whereof I affix my signature.

GEORGE H. JONES.